(12) United States Patent
Kunugi et al.

(10) Patent No.: US 8,088,995 B2
(45) Date of Patent: Jan. 3, 2012

(54) ELECTROLYTE COMPOSITION FOR PHOTOELECTRIC CONVERSION DEVICE AND PHOTOELECTRIC CONVERSION DEVICE USING THE SAME

(75) Inventors: Yoshihito Kunugi, Hiratsuka (JP); Katsuhiko Tsunashima, Tokyo (JP)

(73) Assignees: Tokai University Educational System, Tokyo (JP); Nippon Chemical Industrial Co., Ltd., Tokyo (JP)

( * ) Notice: Subject to any disclaimer, the term of this patent is extended or adjusted under 35 U.S.C. 154(b) by 399 days.

(21) Appl. No.: 12/196,568

(22) Filed: Aug. 22, 2008

(65) Prior Publication Data
US 2011/0083744 A9  Apr. 14, 2011

(30) Foreign Application Priority Data
Aug. 23, 2007  (JP) .................. 2007-217123

(51) Int. Cl.
*H01L 51/42* (2006.01)
(52) U.S. Cl. .................. 136/263; 136/252; 438/82
(58) Field of Classification Search .................. 136/263, 136/252, 261; 438/82
See application file for complete search history.

(56) References Cited

U.S. PATENT DOCUMENTS

| | | | | |
|---|---|---|---|---|
| 2006/0127775 A1* | 6/2006 | Hammami et al. | ............ | 429/324 |
| 2007/0031729 A1* | 2/2007 | Sato et al. | ............ | 429/188 |
| 2007/0215865 A1* | 9/2007 | Liu et al. | ............ | 257/40 |
| 2008/0041438 A1* | 2/2008 | Saito et al. | ............ | 136/244 |
| 2008/0221353 A1* | 9/2008 | Tsunashima | ............ | 564/12 |
| 2009/0053597 A1* | 2/2009 | Tsunashima et al. | ............ | 429/188 |
| 2009/0084443 A1* | 4/2009 | Kunugi et al. | ............ | 136/263 |
| 2010/0229950 A1* | 9/2010 | Kuang et al. | ............ | 136/263 |

* cited by examiner

*Primary Examiner* — Jeffrey T Barton
*Assistant Examiner* — Jayne Mershon
(74) *Attorney, Agent, or Firm* — Westerman, Hattori, Daniels & Adrian, LLP

(57) ABSTRACT

An ionic liquid which is high in ionic conductivity and high in safety without an anxiety of ignition or the like and an electrolyte composition containing the same are provided.

The present invention concerns an electrolyte composition for photoelectric conversion device, containing a quaternary phosphonium salt ionic liquid represented by the following formula (1). A viscosity at 25° C. of this ionic liquid is preferably not more than 200 mPa·sec. In the formula (1), it is preferable that the alkoxyalkyl group is a methoxymethyl group, and all of the alkyl groups are an ethyl group.

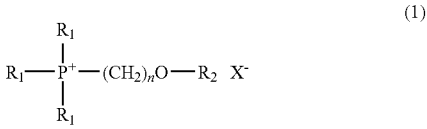

In the formula, $R_1$ represents a linear alkyl group or a branched alkyl group each having from 1 to 6 carbon atoms; $R_2$ represents a methyl group or an ethyl group; n represents an integer of from 1 to 6; and X represents $N(SO_2CF_3)_2$ or $N(CN)_2$.

9 Claims, 1 Drawing Sheet

ELECTROLYTE COMPOSITION FOR PHOTOELECTRIC CONVERSION DEVICE AND PHOTOELECTRIC CONVERSION DEVICE USING THE SAME

FIELD OF THE INVENTION

The present invention relates to an electrolyte composition for photoelectric conversion device containing a quaternary phosphonium salt ionic liquid and to a photoelectric conversion device using the same.

BACKGROUND ART

A silicon based solar cell using monocrystalline silicon, polycrystalline silicon and amorphous silicon has excellent photoelectric conversion efficiency reaching 20% and is put into practical use as a leading technology of the photovoltaic power generation system. However, this silicon based solar cell is high in energy costs on the manufacture of raw materials and is restricted from the viewpoints of price and material supply and the like. On the other hand, in recent years, a dye sensitization type solar cell proposed by Gratzel, et al. gets attention. This has a structure in which an electrolytic liquid lies between a titanium oxide porous electrode having a sensitizing dye supported thereon and a counter electrode, which makes it possible to achieve a large cost reduction from the standpoints of material and manufacturing method and the like.

In this dye sensitization type solar cell, an organic solvent containing an iodine redox pair, such as acetonitrile, ethylene carbonate or the like is used as an electrolytic liquid. For that reason, a lowering of the photoelectric conversion efficiency due to volatilization of the electrolytic liquid, environmental pollution due to leakage of the electrolytic liquid and danger of ignition or the like are pointed out. In order to solve such a problem, a method of using, as an electrolyte, an ionic liquid (ambient-temperature molten salt) which is non-volatile and free from volatilization and ignition is proposed (see, for example, Patent Document 1). A material to be used as the ionic liquid is chiefly a compound having a nitrogen based cation such as imidazolium salts, pyridinium salts, quaternary ammonium salts, pyrrolidinium salts or piperidinium salts (see, for example, Patent Documents 2 to 5). However, in a dye sensitization type solar cell using such an ionic liquid as an electrolyte, there is involved a problem that high viscosity of the ionic liquid affects the diffusion of iodine so that the photoelectric conversion efficiency cannot be made sufficiently high. Furthermore, in even an ionic liquid which is said to be uninflammable, there is no denying of possibility that when exposed at a high temperature, a heat decomposition product is formed and ignited, resulting in causing combustion.

On the other hand, an ionic liquid composed mainly of a phosphorus based quaternary phosphonium cation is also known. It is known that a quaternary phosphonium salt is chemically and thermally stable, and it is also known that the quaternary phosphonium salt has fire retardancy (self-extinguishing properties) in view of the matter that it contains phosphorus. As to the application of the quaternary phosphonium salt to an electrolytic liquid of a dye sensitization type solar cell, an electrolyte composition containing a quaternary ammonium salt and a phosphonium salt composed of an alkyl group or an alkenyl group bonding to a nitrogen atom or a phosphorus atom is described in, for example, Patent Documents 6 and 7. However, all of quaternary phosphonium salt ionic liquids described in these patent documents are high in viscosity, and the problem of a lowering of the photoelectric conversion efficiency has not been solved yet.

[Patent Document 1] JP-A-2002-289267
[Patent Document 2] JP-A-2003-31270
[Patent Document 3] JP-A-2005-85587
[Patent Document 4] JP-A-2005-116367
[Patent Document 5] JP-A-2006-286257
[Patent Document 6] JP-A-2001-35253
[Patent Document 7] WO 02/076924

SUMMARY OF THE INVENTION

One object of the invention is to provide an electrolyte composition for photoelectric conversion device capable of solving the foregoing various defects involved in the conventional technologies and a photoelectric conversion device using the same.

Under these actual circumstances, the present inventors made extensive and intensive investigations. As a result, it has been found that in view of the matter that an ionic liquid composed of a specified quaternary phosphonium salt is noticeably low in viscosity, high in ionic conductivity and rich in heat resistance and fire retardancy, it can be utilized for an electrolyte composition of a dye sensitization type solar cell, leading to accomplishment of the invention.

That is, the invention has the following constitution.

1. An electrolyte composition for photoelectric conversion device, which comprises a quaternary phosphonium salt ionic liquid represented by the following formula (1):

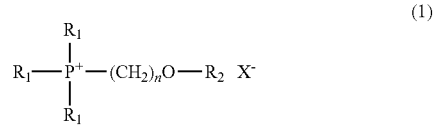

wherein $R_1$ represents a linear alkyl group or a branched alkyl group each having from 1 to 6 carbon atoms; $R_2$ represents a methyl group or an ethyl group; n represents an integer of from 1 to 6; and X represents $N(SO_2CF_3)_2$ or $N(CN)_2$.

2. The electrolyte composition for photoelectric conversion device according to the above 1., which has a viscosity at 25° C. of 200 mPa·sec or less.

3. The electrolyte composition for photoelectric conversion device according to the above 1. or 2., wherein $R_1$ is an ethyl group, and n is 1.

4. The electrolyte composition for photoelectric conversion device according to any one of the above 1. to 3., wherein X represents $N(CN)_2$.

5. The electrolyte composition for photoelectric conversion device according to any one of the above 1. to 4., which further comprises a halogen-containing redox pair composed of a halide ion and a polyhalide ion.

6. The electrolyte composition for photoelectric conversion device according to the above 5., wherein a concentration of the halogen-containing redox pair is from 0.05 to 4.0 M relative to the electrolyte composition.

7. The electrolyte composition for photoelectric conversion device according to any one of the above 1. to 6., which contains 4-tert-butylpyridine or water in an amount of from 0.01 to 4.0 M.

8. A photoelectric conversion device which comprises:
a semiconductor layer;
a dye layer provided on one surface of the semiconductor layer;

a counter electrode disposed opposite to the dye layer; and
an electrolyte layer containing the electrolyte composition according to above 1 and disposed between the dye layer and the counter electrode.

9. The photoelectric conversion device according to the above 8., which is a dye sensitization type solar cell.

The quaternary phosphonium salt ionic liquid to be contained in the electrolyte composition for photoelectric conversion device of the invention is low in viscosity. Accordingly, the electrolyte composition of the invention containing the subject ionic liquid is low in viscosity so that it is high in ionic conductivity. By using this electrolyte composition in a photoelectric conversion device, high photoelectric conversion efficiency is obtainable. Moreover, it is also possible to make both heat resistance and flame retardancy high.

DESCRIPTION OF THE REFERENCE NUMERALS AND SIGNS

Figure 1:
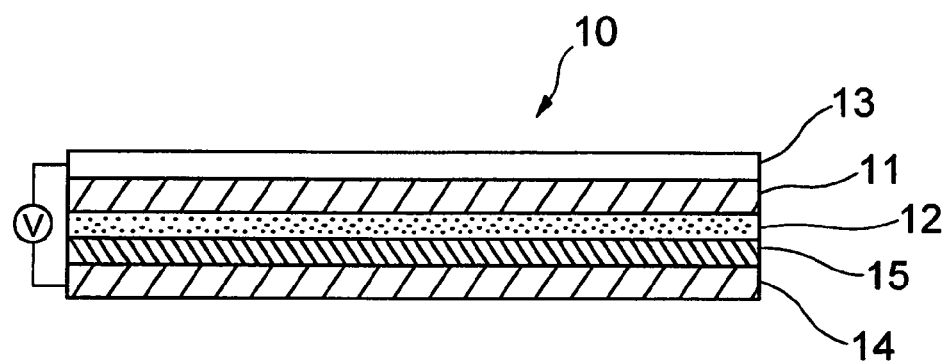
FIG. 1 is a schematic view showing a structure of an embodiment of a photoelectric conversion device of the invention.

10: Photoelectric conversion device
11: Semiconductor layer
12: Dye layer
13: Transparent electrode layer
14: Counter electrode
15: Electrolyte layer

DETAILED DESCRIPTION OF THE INVENTION

The invention is hereunder described on the basis of preferred embodiments thereof. The invention is concerned with an electrolyte composition for photoelectric conversion device containing a quaternary phosphonium salt represented by the foregoing formula (1). Three of the four groups in the quaternary phosphonium salt ionic liquid represented by the formula (1) are the same alkyl group represented by $R_1$, with the remaining one being an alkoxyalkyl group represented by —$(CH_2)_n$O—$R_2$. The quaternary phosphonium salt having such a structure is remarkably low in viscosity as compared to a quaternary phosphonium salt in which all of the groups bonding to phosphorus are only alkyl groups. Though the reason for this has not been completely elucidated yet at present, this may be due to the weakening of a cationic charge by electron donating properties of the alkoxy group. Also, electrochemical stability and heat resistance are enhanced due to the matter that all of the three alkyl groups are the same group.

Specific examples of the alkyl group for $R_1$ in the formula (1) include a methyl group, an ethyl group, an n-propyl group, an n-butyl group, an n-hexyl group, an i-propyl group, an i-butyl group, an n-pentyl group, an n-hexyl group, a cyclopentyl group, a cyclohexyl group, etc. Of these groups, a methyl group or an ethyl group is especially preferable from the viewpoint of the matter that the viscosity of the quaternary phosphonium salt ionic liquid is lowered.

Specific examples of the alkoxyalkyl group represented by —$(CH_2)_n$O—$R_2$ in the formula (1) include a methoxymethyl group, a 2-methoxyethyl group, a 3-methoxypropyl group, a 4-methoxybutyl group, a 5-methoxypentyl group, a 6-methoxyhexyl group, an ethoxymethyl group, a 2-ethoxyethyl group, a 3-ethoxypropyl group, a 4-ethoxybutyl group, a 5-ethoxypentyl group, a 6-ethoxyhexyl group, etc. Of these alkoxyalkyl groups, those in which the alkylene site thereof has one or two carbon atoms, especially one carbon atom is preferable from the viewpoint of lowering the viscosity of the quaternary phosphonium salt ionic liquid and the viewpoint of enhancing the solubility of an organic compound to be contained in the electrolyte composition.

As the anion component of X in the formula (1), bis(trifluoromethylsulfonyl)imide ($N(SO_2CF_3)_2$) or dicyanamide ($N(CN)_2$) is used. As a result of investigations made by the present inventors, it has become clear that by combining such an anion component with the foregoing phosphonium cation component, the viscosity of the ionic liquid becomes extremely low. Of these anion components, the use of dicyanamide is especially preferable because excellent photoelectric conversion efficiency is revealed.

Specific examples of the quaternary phosphonium salt represented by the formula (1) include
triethyl(methoxymethyl)phosphonium bis(trifluoromethylsulfonyl)imide,
triethyl(2-methoxyethyl)phosphonium bis(trifluoromethylsulfonyl)imide,
tri-n-propyl(methoxymethyl)phosphonium bis(trifluoromethylsulfonyl)imide,
tri-n-propyl(2-methoxyethyl)phosphonium bis(trifluoromethylsulfonyl)imide,
tri-n-butyl(methoxymethyl)phosphonium bis(trifluoromethylsulfonyl)imide,
tri-n-butyl(2-methoxyethyl)phosphonium bis(trifluoromethylsulfonyl)imide,
tri-n-pentyl(methoxymethyl)phosphonium bis(trifluoromethylsulfonyl)imide,
tri-n-pentyl(2-methoxyethyl)phosphonium bis(trifluoromethylsulfonyl)imide,
tri-n-hexyl(methoxymethyl)phosphonium bis(trifluoromethylsulfonyl)imide,
tri-n-hexyl(2-methoxyethyl)phosphonium bis(trifluoromethylsulfonyl)imide,
triethyl(methoxymethyl)phosphonium dicyanamide,
triethyl(2-methoxyethyl)phosphonium dicyanamide,
tri-n-butyl(methoxymethyl)phosphonium dicyanamide,
tri-n-butyl(2-methoxyethyl)phosphonium dicyanamide, etc.
Of these, triethyl(methoxymethyl)phosphonium bis(trifluoromethylsulfonyl)imide,
triethyl(2-methoxyethyl)phosphonium bis(trifluoromethylsulfonyl)imide,
tri-n-butyl(methoxymethyl)phosphonium bis(trifluoromethylsulfonyl)imide,
tri-n-butyl(2-methoxyethyl)phosphonium bis(trifluoromethylsulfonyl)imide,
triethyl(methoxymethyl)phosphonium dicyanamide,
triethyl(2-methoxyethyl)phosphonium dicyanamide,
tri-n-butyl(methoxymethyl)phosphonium dicyanamide,
tri-n-butyl(2-methoxyethyl)phosphonium dicyanamide, etc.
are especially preferable from the viewpoint of the matter that low viscosity is revealed. Furthermore, of these, triethyl(methoxymethyl)phosphonium dicyanamide and triethyl(2-methoxyethyl)phosphonium dicyanamide are especially preferable because excellent photoelectric conversion efficiency is revealed.

The quaternary phosphonium salt represented by the formula (1) is a liquid having ionic conductivity at room temperature (25° C.), namely an ionic liquid. A viscosity at 25° C. of this quaternary phosphonium salt ionic liquid is preferably 200 mPa·sec or less, more preferably 100 mPa·sec or less, and further preferably 50 mPa·sec or less. When the viscosity is 200 mPa·sec or less, dehydration efficiency in the purification of the ionic liquid increases, and therefore, it is preferable.

When the viscosity is 100 mPa·sec or less, the diffusion of an iodine redox pair becomes highly efficient, and therefore, it is preferable. Furthermore, when the viscosity is 50 mPa·sec or less, the ionic conductivity is remarkably high, and the photoelectric conversion efficiency increases, and therefore, it is preferable. A lower limit value of the viscosity of the ionic liquid composed of a quaternary phosphonium salt is not particularly limited, and it is preferable that the viscosity is low as far as possible. When the viscosity at 25° C. is low as about 20 mPa·sec, the ionic conductivity is sufficiently high, and the photoelectric conversion efficiency thoroughly increases, and therefore, it is preferable.

The quaternary phosphonium salt represented by the formula (1) can be obtained by allowing a quaternary phosphonium halide and a metal salt of the anion component to react with each other, thereby achieving anion exchange. The quaternary phosphonium halide is a general term of compounds in which the anion segment in the quaternary phosphonium salt represented by the formula (1) is a halogen.

In the case where the quaternary phosphonium halide is a trialkyl (alkoxyalkyl)phosphonium halide, this compound can be obtained by, for example, allowing a trialkylphosphine and an alkoxyalkyl halide to react with each other. In particular, when a method for allowing a trialkylphosphine (formula: $(Ra)_3P$) in which the three alkyl groups bonding to the phosphorus atom are identical and an alkoxyalkyl halide (formula: $X—(CH_2)_nO—Rb$) to react with each other is employed, a desired material with less impurities can be obtained, and therefore, it is preferable. Also, when the halogen of the quaternary phosphonium halide is bromine or iodine, the quaternary phosphonium halide can be purified by recrystallization, and therefore, it is preferable. From this viewpoint, it is preferable to use an alkoxyalkyl bromide or an alkoxyalkyl iodide as the alkoxyalkyl halide. In the case where the halogen of the quaternary phosphonium halide is an element other than bromine and iodine, for example, even when a chloride or the like is concerned, chlorine can be substituted with iodine or bromine by using sodium iodide or the like.

In the case where the quaternary phosphonium halide is a trialkyl(alkoxyalkyl)phosphonium halide, in order to form this compound, the alkoxyalkyl halogen is added in an amount of preferably from 0.5 to 2 times by mole, and more preferably from 0.9 to 1.2 times by mole relative to the trialkylphosphine. The reaction is carried out in a chlorine-free inert solvent, for example, toluene preferably at temperature from 20 to 150° C., and more preferably from 30 to 100° C. and preferably for 3 hours or more, and more preferably for from 5 to 12 hours. The reaction atmosphere is preferably an oxygen-free atmosphere. For example, a nitrogen atmosphere or an argon atmosphere is preferable. When the trilakylphosphine and the alkoxyalkyl halide are allowed to react with each other in an atmosphere where oxygen is present, a trialkylphosphine oxide in which oxygen is bonded to the trialkylphosphine is formed, whereby the yield tends to be lowered. Though the trialkylphosphine oxide can be removed by properly washing with an organic solvent, when the total number of carbon atom in the quaternary phosphonium halide is large, the quaternary phosphonium halide tends to be dissolved in an organic solvent, too, and therefore, its removal becomes difficult. Accordingly, in order that the trialkylphosphine oxide may not be formed, it is preferable to carry out the reaction under an inert atmosphere.

As the metal salt of the anion component to be used for introducing other anion into the quaternary phosphonium halide by means of anion exchange, for example, an alkali metal salt of the foregoing anion component, such as Li salt or the like can be used. When the alkali metal salt is used, an alkali halide formed by a reaction between the subject salt and the quaternary phosphonium halide can be easily removed by water washing or an adsorbing agent, and therefore, it is preferable.

As the water to be used for water washing, ultra pure water or deionized water can be used. It is preferable that the water washing is properly repeatedly carried out until the content of impurities is lowered. Examples of the impurities to be removed by water washing include unreacted raw materials and an alkali halide and the like. When the desired material is a water-soluble ionic liquid such as a dicyanamide salt, the purification by water washing cannot be carried out. Therefore, it is preferable to use an adsorbing agent such as a silica gel, alumina or the like. By using an adsorbing agent, the alkali halide can be efficiently removed. Also, for the purpose of removing the unreacted raw materials and by-products and the like, washing with an organic solvent can be properly carried out, too. As the organic solvent which can be used for washing, a chlorine-free aprotic solvent, for example, pentane, hexane, heptane, etc. is preferably used. By using such an aprotic solvent, aprotic organic compounds such as impurities or the like can be efficiently removed without dissolving the quaternary phosphonium salt therein.

It is preferable that the quaternary phosphonium salt having been washed with water or an organic solvent is purified for the purpose of removing water or the organic solvent. Examples of the purification method include methods such as dehydration by a molecular sieve and desolvation by vacuum drying or the like. In view of the matters that incorporation of impurities can be prevented and that water and the organic solvent can be removed at once, purification by vacuum drying is preferable. In the purification by vacuum drying, a drying temperature is preferably from 70 to 120° C., and more preferably from 80 to 100° C.; and a degree of vacuum is preferably from 0.1 to 1.0 kPa, and more preferably from 0.1 to 0.5 kPa. The time is preferably from about 2 to 8 hours, and more preferably from about 5 to 12 hours.

Thus, the obtained ionic liquid composed of the quaternary phosphonium salt represented by the formula (1) has properties derived from the alkoxyalkyl group including low viscosity, high ionic conductivity, appropriate solubility, chemical stability and thermal stability, and therefore, it is favorably used as an electrolyte of a photoelectric conversion device. In case of low viscosity, not only diffusion or convection is accelerated, and the ionic conductivity is remarkably enhanced, but a degree of increase in the viscosity due to cooling is low, and therefore, it is advantageous from the viewpoint of the matter that the ionic liquid can be used at a low temperature. Also, since the alkoxyalkyl group is introduced, the solubility of the organic compound tends to increase. In other words, by shortening the alkyl group to decrease the molecular weight, a lowly viscous ionic liquid can be obtained, whereas by introducing the alkoxyalkyl group, a problem that the solubility of an organic compound based additive is lowered, which can be solved by shortening of the alkyl group.

Furthermore, organic phosphorus compounds including the quaternary phosphonium salt represented by the formula (1) reveal fire retardancy and self-extinguishing properties. Since the ionic liquid composed of the quaternary phosphonium salt represented by the formula (1) is short in the alkyl group (carbon atom number: 1 to 6) and low in the molecular weight, it is high in a proportion of the phosphorus atom and has appropriate fire retardancy and self-extinguishing properties. Accordingly, the subject ionic liquid can be used as a fire-retardant electrolyte of a photoelectric conversion device.

As described previously, since the ionic liquid composed of the quaternary phosphonium salt represented by the formula (1) is low in the viscosity, it has high ionic conductivity. As a result, not only high short-circuit photocurrent density and photoelectric conversion efficiency are obtainable, but the heat resistance and fire retardancy are high. Accordingly, it is clear that the subject ionic liquid can be advantageously used as an electrolyte composition in a photoelectric conversion device.

As the photoelectric conversion device having the electrolyte composition containing the ionic liquid composed of the quaternary phosphonium salt represented by the formula (1), a device which converts light to electric energy and a device which conversely converts electric energy to light are included. Representative examples of the former include electric power generating devices such as a dye sensitization type solar cell, a photodiode, etc. Representative examples of the latter include light emitting devices such as a light emitting diode, a semiconductor laser, etc.

In the case where the photoelectric conversion device is any of an electric power generating device or a light emitting device, as illustrated in FIG. 1, a photoelectric conversion device 10 is provided with a semiconductor layer 11, a dye layer 12 provided on one surface of the semiconductor 11, a transparent electrode layer 13 provided on the other surface of the semiconductor 11, a counter electrode 14 disposed opposite to the dye layer 12 and an electrolyte layer 15 disposed between the dye layer 12 and the counter electrode 14. A gap between the dye layer 12 and the counter electrode 14, namely a thickness of the electrolyte layer 15 can be in general generated at from 10 to 500 µm. The electrolyte layer 15 is composed of the composition containing the ionic liquid containing the quaternary phosphonium salt represented by the formula (1).

In case of using the photoelectric conversion device 10 as illustrated in FIG. 1 as an electric power generating device, by irradiating light (preferably sunlight, and more preferably visible light) from the side of the transparent electrode layer 13, an electromotive force is generated between the transparent electrode layer 13 and the counter electrode 14. In case of using the photoelectric conversion device 10 as illustrated in FIG. 1 as a light emitting device, by applying a voltage between the transparent electrode layer 13 and the counter electrode 14, light emission occurs between the semiconductor layer 11 and the dye layer 12. Though a leading wire is connected to the transparent electrode layer 13 and the counter electrode 14, the leading wire can also be connected to the semiconductor layer 11 in place of the transparent electrode layer 13. In that case, the transparent electrode layer 13 is not essential.

The photoelectric conversion device 10 using the electrolyte composition consists of the ionic liquid containing the quaternary phosphonium salt represented by the formula (1) is especially useful as a dye sensitization type solar cell which is one kind of the electric power generating device. In particular, the quaternary phosphonium salt ionic liquid having a dicyanamide as an anion is preferable because it is remarkably low in the viscosity as compared with conventional quaternary salt ionic liquids and can be expected to have effects such as an enhancement of ionic conductivity in the electrolyte or the like. Also, when this electrolyte composition is used in a dye sensitization type solar cell, high short-circuit photocurrent density and high release voltage are obtainable as compared with the case of using other ionic liquids, and therefore, such is preferable.

In the case where the photoelectric conversion device using the electrolyte composition containing the ionic liquid composed of the quaternary phosphonium salt represented by the formula (1) is a dye sensitization type solar cell, an example of a specific configuration of the dye sensitization type solar cell is as follows. That is, the dye sensitization type solar cell is configured to include a transparent electrode layer, a nanoporous oxide semiconductor layer coated thereon and having a sensitizing dye supported thereon, a counter electrode and an electrolyte layer containing a redox pair which is disposed in at least a part between the transparent electrode layer and the counter electrode. When light (preferably sunlight, and especially preferably visible light) irradiated from the transparent electrode side excites the dye on the oxide semiconductor, the excited dye injects an electron into a conduction band of the oxide semiconductor. As a result, a formed dye oxidant receives an electron from a reductant in the electrolyte layer and returns to a dye in the ground state, and the reductant becomes an oxidant. The electron injected into the oxide semiconductor layer goes through an external circuit, whereby electron is provided for the oxidant in the electrolyte layer of the counter electrode. According to the foregoing cycle, a stationary photocurrent passes through the circuit.

The foregoing transparent electrode layer is not particularly limited with respect to the kind thereof so far as it has good light transmittance and is able to form a layer composed of a conductive material on the surface thereof to reveal conductivity. It is preferable that a transparent oxide semiconductor, for example, tin-added indium oxide (ITO), tin oxide ($SnO_2$), fluorine-added tin oxide (FTO), zinc oxide (ZnO), etc. is formed singly or in combination as a thin film on a non-conductive and transparent substrate such as glass, polyethylene terephthalate (PET), polyethylene naphthalate (PEN), polycarbonate (PC), etc. The nanoporous oxide semiconductor layer is a porous thin film composed mainly of an oxide semiconductor fine particle using titanium oxide ($TiO_2$), tin oxide ($SnO_2$), tungsten oxide ($WO_3$), zinc oxide (ZnO), niobium oxide ($Nb_2O_5$) or the like singly or in combination. Though an average particle size of the oxide semiconductor fine particle to be used is not particularly limited, it is preferably from 1 to 200 nm, more preferably from 3 to 100 nm, and further preferably from 5 to 50 nm. Though the oxide semiconductor is in general of an n-type, it is not limited thereto but may be of a p-type. The sensitizing dye to be supported on the nanoporous oxide semiconductor is not particularly limited so far as it is able to efficiently absorb light. From the viewpoint of optical pumping under a sunlight irradiation condition, the sensitizing dye is preferably a metal-containing complex such as a ligand-containing ruthenium complex or iron complex containing a bipyridine structure, a terpyridine structure or the like, etc., a porphyrin based or phthalocyanine based metal-containing complex, an organic dye such as eosin, rhodamine, merocyanine, coumarin, etc. or the like. The counter electrode is not particularly limited so far as it is an electrode capable of generating an electromotive power between the counter electrode and the foregoing transparent electrode. However, it is preferable to use one prepared by forming a conductive material such as gold, platinum, a carbon material, etc. as an electrode on a substrate by means of a vacuum fabrication method such as a sputtering method or a vapor deposition method, a coating method, a wet fabrication method for coating a platinum-containing solution such as a chloroplatinic acid solution, etc. and then applying a heat treatment thereto, or other methods.

In the case where the electrolyte composition consists of the ionic liquid containing the quaternary phosphonium salt represented by the formula (1) is used as an electrolyte layer of a dye sensitization type solar cell, it is preferable to add a redox pair in the electrolyte composition. Though the redox pair is not particularly limited so far as an oxidation-reduction potential of the redox pair lies between a reduction potential of the excited dye and an oxidation potential of the counter electrode, it is preferable to use a halogen-containing redox pair composed of a halide ion such as an iodide ion ($I^-$), a bromide ion ($Br^-$), a chloride ion ($Cl^-$), etc. and a polyhalide ion such as $Br_3^-$, $I_3^-$, $I_5^-$, $I_7^-$, $Cl_2I^-$, $ClI_2^-$, $Br_2I^-$, $BrI_2^-$, etc. or the like. Though a concentration of the redox pair relative to the electrolyte composition is not particularly limited, it is preferably from 0.05 to 4.0 M, more preferably from 0.1 to 3.0 M, and further preferably from 0.5 to 2.0 M in terms of molar concentration. This halogen-containing redox pair can be obtained by allowing a halide ion such as an iodide ion, a bromide ion, a chloride ion, etc. to react with a halogen molecule. Though a ratio of the halogen molecule to the halide ion is not particularly limited, it is preferably from 1 to 100%, more preferably from 2 to 50%, and further preferably from 3 to 30% in terms of a molar ratio. As a feed source of the halide ion, a lithium salt, a sodium salt, an imidazolium salt, a quaternary ammonium salt, a quaternary phosphonium salt, a pyridinium salt, a pyrrolidinium salt, a piperidinium salt, a sulfonium salt or the like can be used singly or in combination. It is especially preferable to use a quaternary phosphonium salt singly or in combination with other salt.

In the case where the electrolyte composition containing the ionic liquid containing the quaternary phosphonium salt represented by the formula (1) is used as an electrolyte layer of a dye sensitization type solar cell, for the purpose of enhancing the photoelectric conversion efficiency, it is preferable to add an additive of every kind such as an organic nitrogen compound, for example, 4-tert-butylpyridine (TBP), 2-vinylpyridine, N-vinyl-2-pyrrolidone, etc., a lithium salt, a sodium salt, a magnesium salt, an iodide, a thiocyanate, water or the like in the electrolyte composition, if desired. As demonstrated in the Examples as described later, the use of TBP or a combination of TBP and water as the additive is preferable because the photoelectric conversion efficiency is further enhanced. Though the addition amount of such an additive is not particularly limited, it is preferably from 0.01 to 4.0 M, more preferably from 0.05 to 3.0 M, and further preferably from 0.1 to 2.0 M in terms of a molar concentration of each additive in the electrolyte composition.

EXAMPLES

The invention is specifically described below with reference to the following Examples. Unless otherwise indicated, the term "%" refers to "% by weight".

Synthesis Example 1

Synthesis of Triethyl(Methoxmethyl)Phosphonium Bis(Trifluoromethylsulfonyl)Imide and Measurement of Physical Properties (1) Synthesis:

62 g (0.5 moles) of bromomethylmethyl ether (a reagent available from Tokyo Chemical Industry Co., Ltd.) was added dropwise in 236 g (0.5 moles) of a 25% toluene solution of triethylphosphine (HISHICOLIN (registered trademark) P-2, a trade name of Nippon Chemical Industrial Co., Ltd.), and the mixture was allowed to react at 70 to 80° C. for 6 hours. After completion of the reaction, hexane was added for crystallization, thereby obtaining 97 g (percent yield: 80%) of a crystal of triethyl(methoxymethyl)phosphonium bromide. 86 g (0.3 moles) of lithium bis(trifluoromethylsulfonyl)imide (a reagent available from Kanto Chemical Co., Inc.) was added to 73 g (0.3 moles) of this triethyl(methoxymethyl)phosphonium bromide, and the mixture was allowed to react in an aqueous system. Subsequently, the reaction mixture was stirred for aging at room temperature for 3 hours. After completion of stirring, a lower layer (product) was separated. The separated product was washed with pure water four times and then washed with hexane four times. After completion of washing, the product was dried in vacuo at 100° C. and at a degree of vacuum of 0.5 kPa for 5 hours. Confirmation of the obtained product was carried out by means of $^1$H-NMR, $^{13}$C-NMR, $^{31}$P-NMR and $^{19}$F-NMR. A yield of the product (colorless transparent liquid) was 104 g (percent yield: 78%), and it was confirmed by 3P-NMR that its purity was 98% or more.

(2) Measurement of Physical Properties:

A melting point of the product was measured by differential scanning calorimetry (DSC6200 available from Seiko Instruments Inc.). Also, its viscosity was measured using a vibration type viscometer (VM-10A available from CBC Co., Ltd.). In the viscosity, an error of about ±5% is generated depending upon the measurement condition. Furthermore, a thermal decomposition temperature (10% loss in weight) was measured using a thermogravimetric analyzer (TG/DTA6300 available from Seiko Instruments Inc.). The measurement results are shown in the following Table 1. The foregoing measurements were all carried out under a nitrogen atmosphere.

Synthesis Example 2

Synthesis of Triethyl(Methoxmethyl)Phosphonium Dicyanamide And Measurement of Physical Properties (1) Synthesis:

27 g (0.3 moles) of sodium dicyanamide (a reagent available from Wako Pure Chemical Industries, Ltd.) was added to 73 g (0.3 moles) of triethyl(methoxymethyl)phosphonium bromide as synthesized in the same manner as in Synthesis Example 1, and the mixture was allowed to react. Subsequently, the reaction mixture was stirred for aging at room temperature for 3 hours. After completion of stirring, the product was extracted with dichloromethane and passed through a silica gel column for purification. The solvent was distilled off, and the residue was dried in vacuo at 100° C. and at a degree of vacuum of 0.5 kPa for 5 hours. Confirmation of the thus obtained product was carried out by means of $^1$H-NMR, $^{13}$C-NMR and $^{31}$P-NMR. A yield of the product (pale yellow transparent liquid) was 34 g (percent yield: 50%), and it was confirmed by $^{31}$P-NMR that its purity was 98% or more.

(2) Measurement of Physical Properties:

The melting point, viscosity and thermal decomposition temperature of the product were measured in the same manners as in Synthesis Example 1. The measurement results are shown in the following Table 1.

Synthesis Example 3 (Comparison)

Synthesis of Triethylpentylphosphonium Dicyanamide and Measurement of Physical Properties (1) Synthesis:

77 g (0.5 moles) of 1-bromopentane (a reagent available from Tokyo Chemical Industry Co., Ltd.) was added dropwise in 236 g (0.5 moles) of a 25% toluene solution of triethylphosphine (HISHICOLIN (registered trademark) P-2, a trade name of Nippon Chemical Industrial Co., Ltd.), and the mixture was allowed to react at 70 to 80° C. for 6 hours. After completion of the reaction, hexane was added for crystallization, thereby obtaining 113 g (percent yield: 84%) of a crystal of triethylpentylphosphonium bromide. 27 g (0.3 moles) of sodium dicyanamide (a reagent available from Wako Pure Chemical Industries, Ltd.) was added to 81 g (0.3 moles) of this triethylpentylphosphonium bromide, and the mixture was allowed to react in an aqueous system. Subsequently, the reaction mixture was stirred for aging at room temperature for 3 hours. After completion of stirring, a product was extracted with dichloromethane and passed through a silica gel column for purification. The solvent was distilled off, and the residue was dried in vacuo at 100° C. and at a degree of vacuum of 0.5 kPa for 5 hours. Confirmation of the thus obtained product was carried out by means of $^1$H-NMR, $^{13}$C-NMR and $^{31}$P-NMR. A yield of the product (pale yellow transparent liquid) was 77 g (percent yield: 69%), and it was confirmed by $^{31}$P-NMR that its purity was 98% or more.

(2) Measurement of Physical Properties:

The melting point, viscosity and thermal decomposition temperature of the product were measured in the same manners as in Synthesis Example 1. The measurement results are shown in the following Table 1.

Synthesis Example 4 (Comparison)

Synthesis of Triethyl(2-methoxyethyl)Phosphonium Tetrafluoroborate and Measurement of Physical Properties (1) Synthesis:

73 g (0.5 moles) of 2-bromoethylmethyl ether (a reagent available from Tokyo Chemical Industry Co., Ltd.) was added dropwise in 236 g (0.5 moles) of a 25% toluene solution of triethylphosphine (HISHICOLIN (registered trademark) P-2, a trade name of Nippon Chemical Industrial Co., Ltd.), and the mixture was allowed to react at 70 to 80° C. for 6 hours. After completion of the reaction, hexane was added for crystallization, thereby obtaining 125 g (percent yield: 97%) of a crystal of triethyl(2-methoxyethyl) phosphonium bromide. 33 g (0.3 moles) of sodium borofluoride (a reagent available from Kanto Chemical Co., Inc.) was added to 77 g (0.3 moles) of this triethyl (2-methoxyethyl)phosphonium bromide, and the mixture was allowed to react in an aqueous system. Subsequently, the reaction mixture was stirred for aging at room temperature for 3 hours. After completion of stirring, a product was completely dehydrated at 100° C. and at a degree of vacuum of 0.5 kPa, to which was further added 100 mL of dry methylene chloride, and a precipitate was filtered. This filtrate was concentrated and dried in vacuo at 100° C. and at a degree of vacuum of 0.5 kPa for 5 hours. Confirmation of the thus obtained product was carried out by means of $^1$H-NMR, $^{13}$C-NMR, $^{31}$P-NMR and $^{19}$F-NMR. A yield of the product (colorless transparent liquid) was 60 g (percent yield: 76%), and it was confirmed by $^{31}$P-NMR that its purity was 98% or more.

(2) Measurement of Physical Properties:

The melting point, viscosity and thermal decomposition temperature of the product were measured in the same manners as in Synthesis Example 1. The measurement results are shown in the following Table 1.

Synthesis Example 5 (Comparison)

Synthesis of Triethyl(Methoxymethyl)Ammonium Bis(Trifluoromethylsulfonyl)Imide and Measurement of Physical Properties (1) Synthesis:

77 g (0.6 moles) of bromomethylmethyl ether (a reagent available from Tokyo Chemical Industry Co., Ltd.) was added dropwise in 51 g (0.5 moles) of triethylamine (a reagent available from Tokyo Chemical Industry Co., Ltd.), and the mixture was allowed to react at 60 to 70° C. for 6 hours. After completion of the reaction, hexane was added for crystallization, thereby obtaining 96 g (percent yield: 85%) of a crystal of triethyl(methoxymethyl)ammonium bromide. 52 g (0.18 moles) of lithium bis(trifluoromethylsulfonyl)imide (a reagent available from Kanto Chemical Co., Inc.) was added to 34 g (0.15 moles) of this triethyl(methoxymethyl)ammonium bromide, and the mixture was allowed to react in an aqueous system. Subsequently, the reaction mixture was stirred for aging at room temperature for 3 hours. After completion of stirring, a lower layer (product) was separated. The separated product was washed with pure water four times and then washed with hexane four times. After completion of washing, the product was dried in vacuo at 100° C. and at a degree of vacuum of 0.5 kPa for 5 hours. Confirmation of the thus obtained product was carried out by means of $^1$H-NMR, $^{13}$C-NMR and $^{19}$F-NMR. A yield of the product (colorless transparent liquid) was 59 g (percent yield: 93%)

(2) Measurement of Physical Properties:

The melting point, viscosity and thermal decomposition temperature of the product were measured in the same manners as in Synthesis Example 1. The measurement results are shown in the following Table 1.

TABLE 1

| | Melting point (° C.) | Thermal decomposition temperature (° C.) | Viscosity (mPa · sec) at 25° C. |
|---|---|---|---|
| Synthesis Example 1 | 14 | 388 | 35 |
| Synthesis Example 2 | -8 | 288 | 31 |
| Synthesis Example 3 (Comparison) | -5 | 392 | 70 |
| Synthesis Example 4 (Comparison) | 16 | 300 | 194 |
| Synthesis Example 5 (Comparison) | -3 | 287 | 69 |

Examples 1 to 5 and Comparative Examples 1 to 2

As shown in Table 2, an ionic liquid composed of the compound obtained in each of the Synthesis Examples and a redox pair and optionally, an additive were mixed to prepare an electrolyte composition.

TABLE 2

| | Ionic liquid | Redox pair | Additive |
|---|---|---|---|
| Example 1 | Synthesis Example 1 | P222(101)*[1]-I: 1.0 M I$_2$: 0.1 M | Nil |
| Example 2 | Synthesis Example 1 | P222(101)*[1]-I: 1.0 M I$_2$: 0.1 M | TBP*[3]: 1.0 M LiI: 0.1 M |
| Example 3 | Synthesis Example 2 | P222(101)*[1]-I: 1.0 M I$_2$: 0.1 M | Nil |
| Example 4 | Synthesis Example 2 | P222(101)*[1]-I: 1.0 M I$_2$: 0.1 M | TBP*[3]: 1.0 M LiI: 0.1 M |

TABLE 2-continued

|  | Ionic liquid | Redox pair | Additive |
|---|---|---|---|
| Example 5 | Synthesis Example 2 | P222(101)*[1]-I: 1.0 M $I_2$: 0.1 M | TBP*[3]: 1.0 M LiI: 0.1 M $H_2O$: 0.55 M |
| Comparative Example 1 | Synthesis Example 3 | P2225*[2]-I: 1.0 M $I_2$: 0.1 M | Nil |
| Comparative Example 2 | Synthesis Example 3 | P2225*[2]-I: 1.0 M $I_2$: 0.1 M | TBP*[3]: 1.0 M LiI: 0.1 M |

*[1]Triethyl(methoxymethyl)phosphonium
*[2]Triethylpentylphosphonium
*[3]4-tert-Butylpyridine A dye sensitization type solar cell was prepared using the obtained electrolyte composition in the following procedures and evaluated in the following methods. The results are shown in Table 3.

An electrode prepared by baking a fluorine-added tin oxide transparent electrode (FTO, manufactured by Asahi Glass Co., Ltd.; 10.8 $\Omega \cdot cm^{-2}$), in which a titanium oxide nano particle (SOLARONIX D) had been coated thereon in a thickness of 15 μm by a doctor blade at 450° C. for 30 minutes, was used as a photo-anode. This photo-anode was immersed with an ethanol solution of 0.3 mM of N3 dye (cis-di(thiocyanate)-N,N-bis(2,2'-bipyridyl-4,4'-dicarboxylic acid) ruthenium(II) complex) at 40° C. for several hours, thereby supporting the dye thereon. The photo-anode having a dye supported thereon and a platinum-supported counter electrode were sandwiched to assemble a cell (spacing: 50 μm), and the electrolyte composition obtained in each of the Examples and Comparative Examples was filled therebetween. An active area of the photo-anode was 0.283 cm², and other surface was masked. A dye sensitization type solar cell was prepared in the usual way except for the foregoing. With respect to the thus obtained dye sensitization type solar cell, photocurrent-electromotive voltage properties were measured by using an AM1.5 solar simulator (PECCELL PEC-L10N) equipped with a KEITHLEY 2400 type high voltage power source and a 500-W xenon lamp. Light intensity was adjusted using an ND filter (100 $mWcm^{-2}$). All of the measurements were carried out under a condition at room temperature and atmospheric pressure. The form factor is an index exhibiting an electrical internal loss, and it is meant that the larger the numerical value, the higher the performance of the cell.

TABLE 3

|  | Release voltage (V) | Short-circuit photocurrent density (mAcm$^{-2}$) | Form factor (%) | Photoelectric conversion efficiency (%) |
|---|---|---|---|---|
| Example 1 | 0.416 | 13.0 | 0.32 | 1.7 |
| Example 2 | 0.570 | 9.80 | 0.52 | 2.9 |
| Example 3 | 0.623 | 10.7 | 0.55 | 3.7 |
| Example 4 | 0.669 | 11.9 | 0.42 | 3.3 |
| Example 5 | 0.720 | 12.7 | 0.63 | 5.8 |
| Comparative Example 1 | 0.631 | 7.24 | 0.50 | 2.3 |
| Comparative Example 2 | 0.660 | 8.26 | 0.47 | 2.6 |

As is clear from the results as shown in Table 3, it is understood that the solar cells using the electrolyte composition of each of the Examples exhibit high short-circuit photocurrent density and high photoelectric conversion efficiency as compared with the solar cells using each of the electrolyte compositions of the Comparative Examples.

In particular, as is clear from the results of Example 5, it is noted that when a combination of 4-tert-butylpyridine and water is used, the photoelectric conversion efficiency is very high.

While the invention has been described in detail and with reference to specific embodiments thereof, it will be apparent to one skilled in the art that various changes and modifications can be made therein without departing from the spirit and scope thereof.

The present application is based on Japanese Patent Application No. 2007-217123 filed on Aug. 23, 2007, and the contents are incorporated herein by reference.

What is claimed is:

1. A photoelectric conversion device including an electrolyte composition, which comprises a quaternary phosphonium salt ionic liquid represented by the following formula (I):

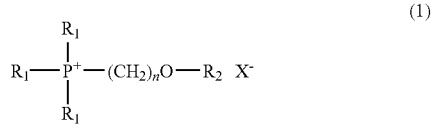

wherein $R_1$ represents a linear alkyl group or a branched alkyl group each having from 1 to 6 carbon atoms; $R_2$ represents a methyl group or an ethyl group; n represents an integer of from 1 to 6; and X represents $N(CN)_2$.

2. The photoelectric conversion device according to claim 1, wherein the electrolyte composition which has a viscosity at 25° C. of 200 mPa·sec or less.

3. The electrolyte composition for photoelectric conversion device according to claim 1 or 2, wherein $R_1$ of the electrolyte composition is an ethyl group, and n is 1.

4. The photoelectric conversion device according to claim 1 or 2, wherein the electrolyte composition further comprises a halogen-containing redox pair composed of a halide ion and a polyhalide ion.

5. The photoelectric conversion device according to claim 4, wherein a concentration of the halogen-containing redox pair is from 0.05 to 4.0 M relative to the electrolyte composition.

6. The photoelectric conversion device according to claim 1 or 2, wherein the electrolyte composition which contains 4-tert-butylpyridine or water in an amount of from 0.01 to 4.0 M.

7. The photoelectric conversion device according to claim 1 which further comprises:
a semiconductor layer;
a dye layer provided on one surface of the semiconductor layer;
a counter electrode disposed opposite to the dye layer; and
an electrolyte layer containing the electrolyte composition disposed between the dye layer and the counter electrode.

8. The photoelectric conversion device according to claim 7, which is a dye sensitization type solar cell.

9. The photoelectric conversion device according to claim 1, wherein the electrolyte composition provides a photoelectric conversion efficiency of 3.3% to 5.8%.

* * * * *